(12) United States Patent
Marmaros

(10) Patent No.: US 8,335,837 B2
(45) Date of Patent: Dec. 18, 2012

(54) TRANSFERRING DATA BETWEEN APPLICATIONS

(75) Inventor: David Marmaros, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/284,605

(22) Filed: Oct. 28, 2011

(65) Prior Publication Data

US 2012/0047451 A1 Feb. 23, 2012

Related U.S. Application Data

(63) Continuation of application No. 12/869,346, filed on Aug. 26, 2010, now Pat. No. 8,069,223, which is a continuation of application No. 11/096,859, filed on Mar. 31, 2005, now Pat. No. 7,805,495.

(51) Int. Cl.
*G06F 15/173* (2006.01)

(52) U.S. Cl. ........................................ 709/217

(58) Field of Classification Search .................. 709/217, 709/223, 220
See application file for complete search history.

(56) References Cited

U.S. PATENT DOCUMENTS

| | | | |
|---|---|---|---|
| 5,408,421 A | 4/1995 | Prest et al. | |
| 5,497,491 A | 3/1996 | Mitchell et al. | |
| 5,604,824 A | 2/1997 | Chui et al. | |
| 5,864,751 A | 1/1999 | Kazami | |
| 6,182,212 B1 | 1/2001 | Atkins et al. | |
| 6,336,124 B1 | 1/2002 | Alam et al. | |
| 6,421,050 B1 | 7/2002 | Rumi et al. | |
| 6,546,393 B1 | 4/2003 | Khan | |
| 6,661,531 B1 | 12/2003 | Murphy et al. | |
| 6,684,242 B1 | 1/2004 | Bahlmann | |
| 6,697,837 B1 | 2/2004 | Rodov | |
| 6,711,624 B1 | 3/2004 | Narurkar et al. | |
| 6,742,181 B1 | 5/2004 | Koike et al. | |
| 6,944,653 B2 | 9/2005 | Fong et al. | |
| 6,963,908 B1 | 11/2005 | Lynch et al. | |
| 6,993,476 B1 * | 1/2006 | Dutta et al. | ................. 704/9 |
| 7,032,011 B2 | 4/2006 | Woodard et al. | |
| 7,032,036 B2 | 4/2006 | Linsley | |
| 7,043,086 B2 | 5/2006 | Rijavec et al. | |
| 7,065,588 B2 | 6/2006 | Konda et al. | |
| 7,340,439 B2 | 3/2008 | Burger et al. | |
| 7,506,253 B2 * | 3/2009 | Armstrong et al. | ........... 715/256 |
| 7,512,757 B2 | 3/2009 | Hiraiwa et al. | |
| 7,532,231 B2 | 5/2009 | Pepperell et al. | |
| 7,760,378 B2 | 7/2010 | Maruyama | |
| 7,805,495 B2 | 9/2010 | Marmaros | |
| 2004/0237045 A1 | 11/2004 | Meltzer | |
| 2010/0325241 A1 | 12/2010 | Marmaros | |

OTHER PUBLICATIONS

PCT International Search Report for PCT Application No. US2006/012370, mailed Jun. 7, 2006 (3 pages).
PCT Written Opinion for PCT Application No. US2006/012370, mailed Jun. 7, 2006 (7 pages).
Fichter, D., "Tools for Finding Things Again," Online, vol. 28, No. 5, Sep. 2004-Oct. 2004, pp. 52-56, XP008066006, Wilton, Connecticut.
School of Natural Resources & Environment, "O&A/How-To Documents from SNRE IT Services," http://sitemaker.umich.edu/snre-it-howto/transferring_bookmarks (2 pages).
European Search Report corresponding to EP 12 16 8355 mailed Aug. 22, 2012, 8 pages.

* cited by examiner

*Primary Examiner* — David Eng
(74) *Attorney, Agent, or Firm* — Harrity & Harrity, LLP

(57) ABSTRACT

In one embodiment, a method for transferring web browser data between web browsers includes collecting browser data pertaining to a first web browser, packaging the browser data into an intermediate format, and storing the packaged data for a subsequent import into a second web browser.

24 Claims, 5 Drawing Sheets

TRANSFERRING DATA BETWEEN APPLICATIONS

RELATED APPLICATIONS

This application is a continuation of U.S. application Ser. No. 12/869,346, filed Aug. 26, 2010, which is a continuation of U.S. application Ser. No. 11/096,859, filed Mar. 31, 2005, now U.S. Pat. No. 7,805,495, the disclosures of which are incorporated herein by reference.

FIELD OF INVENTION

The field of invention relates generally to transferring application-specific data between applications, and more particularly, to transferring web browser data between web browsers.

BACKGROUND

A web browser is an application program that provides a way to look at and interact with information on the Internet. A web browser typically uses the Hypertext Transfer Protocol (HTTP) to make requests of web servers throughout the Internet on behalf of the browser user. Known web browsers include, for example, Microsoft® Internet Explorer (IE), Netscape® Navigator, Opera browser, Firefox browser and Lynx browser.

Each web browser is associated with a set of browser data that includes, for example, bookmarks, security settings, general settings, links to pages visited by a user, a home page, cookie settings, user interface (UI) elements (e.g., toolbar positions and visibility), etc. A user may decide to switch to a different web browser. For example, the user may switch to a different web browser installed on the same or different computer, or to a different instance of the same web browser installed on the same or different computer. Currently, when a user switches to a new IE browser, the user can transfer bookmarks from an old IE browser to the new IE browser. However, the user has to manually enter the rest of the browser data for the new web browser. In addition, if the two web browsers are of different types (e.g., an old web browser is Netscape Navigator and a new web browser is Microsoft IE), the user may not be able to transfer any of the old web browser data to the new browser.

Thus, what is desired is a method or system that helps overcome one or more of the above-described limitations.

SUMMARY

In one embodiment, a method for transferring web browser data between web browsers includes collecting browser data pertaining to a first web browser, packaging the browser data into an intermediate format, and storing the packaged data for a subsequent import into a second web browser.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for transferring web browser data between web browsers is described. The web browser data includes various property settings specific to a current instance of the web browser by the current instance of the web browser. For example, the web browser data may include bookmarks, security settings, general settings, links to documents accessed by a user, information specifying frequency and times when the documents were accessed (e.g., to determine which links should be displayed in the "already-visited" color, or to power the history pane), a home page, cookie settings, user interface (UI) elements, intermediate files maintained by the web browser, profile/autofill data (e.g., information maintained by a browser for "My Profile" option of a business card tool), password data (e.g., a subset of filled in forms), input history data (e.g., a list of data filled in by a user for text boxes and other web forms encountered by the user), popup blocker and whitelisted sites data, data identifying language and character set, accessibility data, etc. UI elements associated with the web browser may specify, for example, visibility of toolbars in the browser windows, positioning of toolbars within the browser window, visibility of buttons on a toolbar, positioning of buttons on the toolbar, color settings, background images, etc. Intermediate files maintained by the web browser may include, for example, cached documents viewed by the user, plug-in executable files (e.g., plug-ins for displaying different types of audio and video messages), browsing history records, and various temporary files used by the web browser.

In one embodiment, a user may request to export web browser data pertaining to the current web browser. For example, the user may issue such a request by pressing an export settings button on a toolbar in the browser window. In response to the user request, the web browser data is exported from the current web browser, packaged into an intermediate format and stored in a designated data store. The designated data store may be on the same computer as the present web browser or on a server coupled to this computer via a network.

Subsequently, when the user issues a request to import the web browser data onto a new web browser, the stored web browser data is retrieved and applied to the new web browser. The new web browser may be a different web browser installed on the same or different computer. For example, the old web browser may be Microsoft®Internet Explorer (IE) and the new web browser may be Netscape® Navigator. Alternatively, the new web browser may be a different instance of the same web browser (e.g., the IE browser) installed on the same or different computer.

Figure 1:
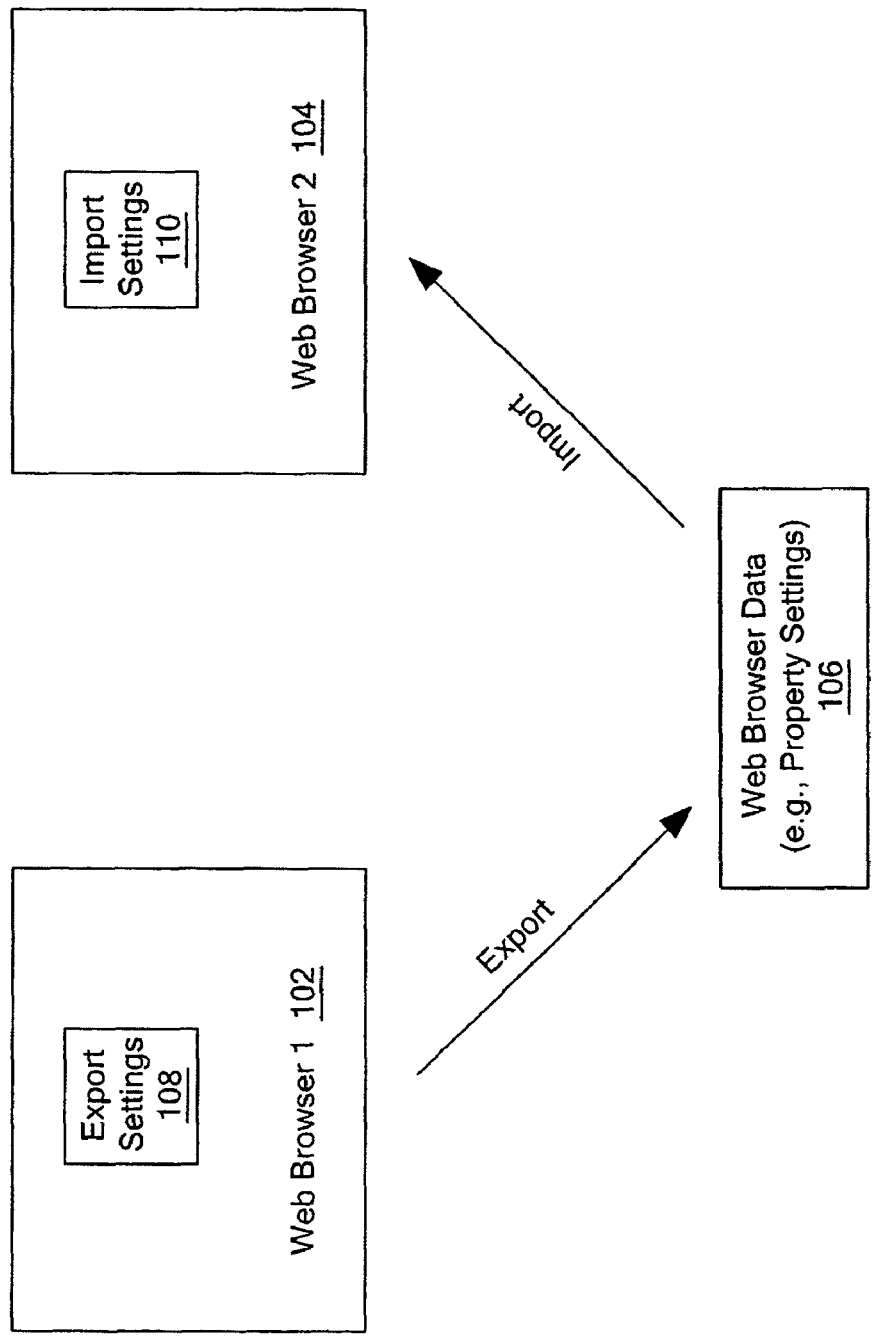
FIG. 1 presents a diagram illustrating an overview of one embodiment of the present invention.

FIG. 1 presents a diagram illustrating an overview of one embodiment of the present invention.

Referring to FIG. 1, a browser window 102 controlled by a first web browser includes an export settings button 108. When a user presses the button 108, the web browser data pertaining to the first web browser 102 is gathered, packaged into an intermediate format, and stored in a data store 106. The data store 106 may be on the same computer as the first web browser or on a server coupled to this computer via a network (e.g., a public network or a local area network).

A browser window 104 is controlled by a second web browser. The second web browser may be a different web browser installed on the same or different computer, or a different instance of the same web browser installed on the same or different computer. The browser window 104 includes an import settings button 10. When the user presses the button 10, the web browser data pertaining to the first web browser is retrieved from the data store 106 and applied to the second web browser. In one embodiment, if the second web browser supports only a subset of the web browser data pertaining to the first web browser, only the web browser data supported by the second web browser is imported onto the second web browser.

It should be noted that the techniques described herein are not limited to web browser applications and can be used with various other applications. For example, these techniques may be used to transfer settings between different instances of Microsoft Word or Microsoft PowerPoint, or to transfer settings from Microsoft Word to Microsoft PowerPoint and vice versa. In another example, these techniques may be used to transfer settings between a web browser and some other application (e.g., Microsoft Word).

In addition, references throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Further, the term "document" as used herein broadly refers to various items, such as files, directories, or other data or information that may be stored, received, sent, created or otherwise processed by one or more computing devices. For example, a document may include any file created on a computing system. The term file as used herein includes a collection of bytes or bits stored as an individual entity. For example, a file may be a binary file, a text file, or a combination thereof, such as a word processor file, a data file, a spreadsheet, a workbook, an image, a drawing, an audio file, a video file, an audio/visual file, a multimedia file, an archive file, a batch file, a source file, an object file, or an executable program. The term file may also refer to a file system object which is accessed as though the object were a file. A document may be linked to one or more other documents, such as via a hyperlink. A document may include a web page, such as a file coded in a markup language (e.g. hypertext markup language (HTML) or extensible markup language (XML)), a file coded in a scripting language (e.g. JavaScript, Active Server Pages (ASP), or Perl), or a file viewed in a web browser (e.g. a portable document format (PDF), an image file or text file). A document may reside on a single system, or may be accessed by one or more systems via a network, e.g. an Intranet or the Internet.

Furthermore, the particular features, structures, or characteristics may be combined in any suitable manner in one or more embodiments.

System Architecture

Figure 2:
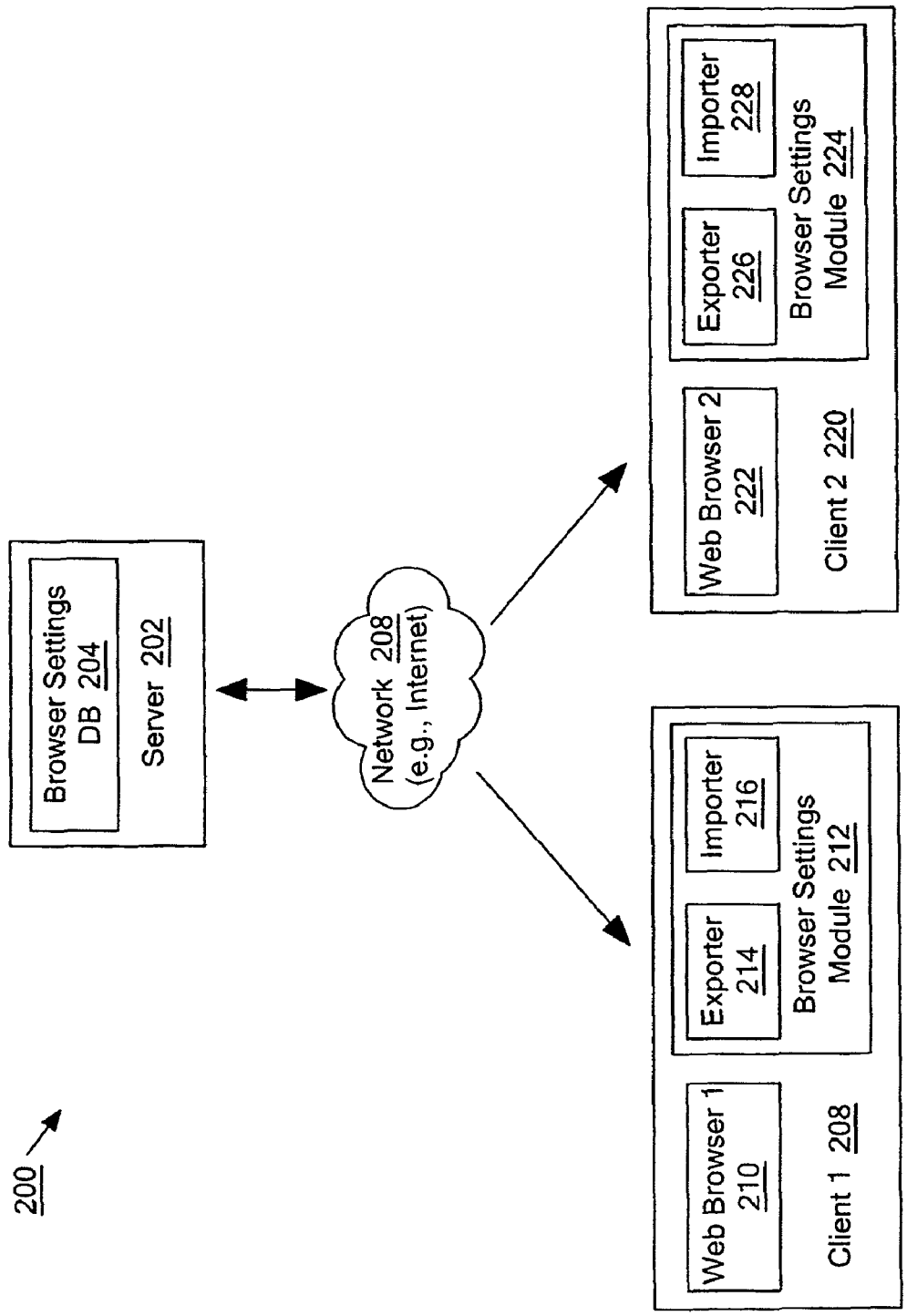
FIG. 2 is a block diagram illustrating an architecture in which one embodiment of the present invention may be implemented.

FIG. 2 is a block diagram illustrating an architecture 200 in which one embodiment of the present invention may be implemented. The architecture 200 includes client devices 208 and 220, a server 202, and a network 206.

The client devices 208 and 220 may be personal computers (PCs), wireless telephones, palm-sized computing devices, personal digital assistants (PDAs), consumer electronic devices, etc. The client devices 208 and 220 are coupled to the server 202 via the network 206, which may be a public network (e.g., Internet) or a private network (e.g., Ethernet or a local area Network (LAN)).

The client devices 208 and 220 host web browsers 210 and 222 respectively. The web browsers 210 and 222 may be of the same type (e.g., the IE browser) or of different types (e.g., the IE browser and the Firefox browser). The client devices 208 and 220 also include browser settings modules 212 and 224 respectively. The browser settings module 212 or 224 may be a part of the corresponding web browser 210 or 220, or a part of some other application (e.g., Google® Firefox Toolbar, Google® Toolbar for Windows, etc.) running on the corresponding client device 208 or 220, or an independent application running on the corresponding client device 208 or 220. In one embodiment, the module 212 is part of a first instance of a specific application (e.g., IE browser or Google Toolbar), and the module 224 is part of a second instance of the same application. Alternatively, the module 212 may be a part of one application (e.g., IE browser) and the module 224 may be a part of another application (e.g., Yahoo Toolbar).

The browser settings modules 212 and 224 communicate with the server 202. In one embodiment, both modules 212 and 224 communicate with the server 202 using the same network protocol (e.g., hypertext transfer protocol (HTTP). Alternatively, the modules 212 and 224 communicate with the server 202 using different network protocols (e.g., HTTP and file transfer protocol (FTP)).

In one embodiment, each of the browser settings modules 212 and 220 includes an exporter (i.e., exporters 214 and 226) and an importer (e.g., importers 216 and 228). Alternatively, the browser settings module 212 or 220 may only include either the exporter or the importer but not both of them.

The exporter 214 or 226 is responsible for collecting web browser data pertaining to the web browser 210 or 222 respectively, packaging the collected data into a canonical format, and sending the web browser data in the canonical format to the server 202, which then stores this web browser data in a browser settings database 204. A canonical format referred to herein is an intermediate format that provides a flexible way for describing data and is understandable by various browser settings modules including modules 212 and 224. Examples of the canonical format may include the extension markup language (XML) format, the binary format, etc.

The browser settings database 204 stores web browser data for various web browsers. In an another embodiment, the browser settings database 204 may be located on the client device 208 or 220. Alternatively, the web browser data may be stored using a different storage means (e.g., a file on disk).

The importer 216 or 228 is responsible for importing, onto the web browser 210 or 222 respectively, web browser data pertaining to a different web browser. For example, the importer 216 may import web browser data pertaining to the web browser 222 onto the web browser 210. In one embodiment, if the web browser targeted for import supports only a subset of web browser data pertaining to the source web browser, the importer extracts the subset supported by the target web browser from the relevant web browser data stored in the database 204 and applies the extracted web browser data to the target web browser.

In one embodiment, the importer 216 or 228 can only import specific web browser data. The importer 216 or 228 may determine whether a web browser data item can be imported by comparing a data type tag assigned to the web browser data item by the exporter 214 or 226 with a predefined list of allowed data types. In one embodiment, if the importer 216 or 228 encounters a web browser data item of an unknown type, heuristics rules are utilized to determine how to handle this web browser data item.

In one embodiment, the browser settings module 212 or 224 displays an export settings button and/or an import settings button as part of a toolbar or somewhere else within the browser window. When the user presses the export settings button, the exporter 214 or 226 initiates the export of relevant web browser data. Similarly, when the user presses the import settings button, the importer 216 or 228 initiates the import of desired web browser data.

Alternatively, the user may request export or import of browser settings by selecting a specific option in a web browser window (e.g., by selecting an entry in Tools dropdown list) or somewhere else on the screen (e.g., on the control panel, a separate application, etc.), or pressing a specific key on the keyboard, or using some other method.

In one embodiment, when a user issues a request to export/import web browser settings, the user is allowed to specify the desired settings. For example, once the user presses the export settings button, the user is presented with a list of settings that can be exported, from which the user can select some settings for exporting.

In another embodiment, the export occurs automatically (i.e., without a user request) at regular intervals (e.g., for a backup function). Similarly, the import may also occur automatically at regular intervals (e.g., to keep two computers synchronized).

Description of Process

Figure 3:
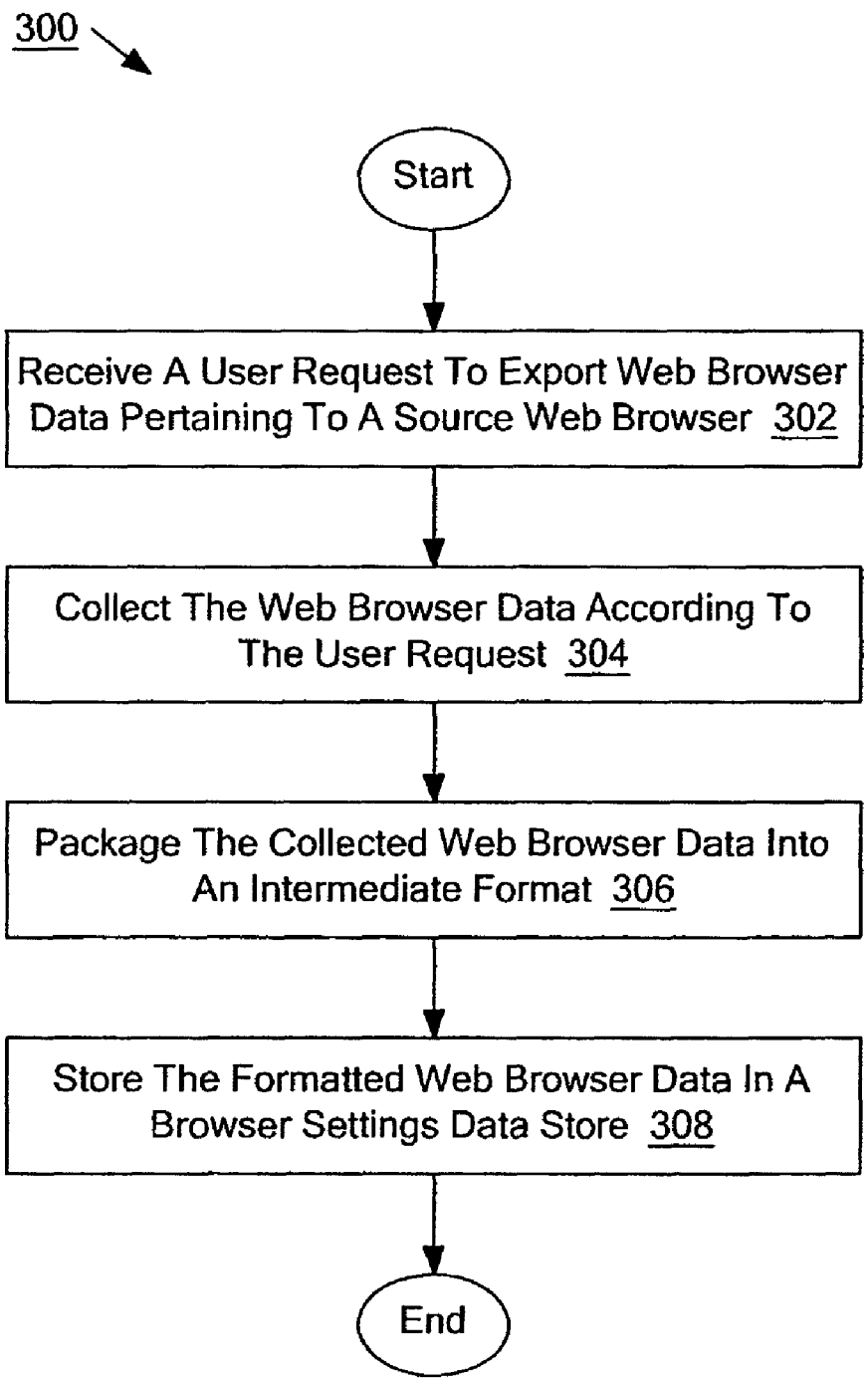
FIG. 3 is a flow diagram of one embodiment of a method for exporting web browser data.

FIG. 3 presents a flow diagram of one embodiment of a method 300 for exporting web browser data. The method may be performed by processing logic, which may comprise hardware, software, or a combination of both. Processing logic may reside either in a client device, or partially or entirely in a separate device and/or system(s).

At block 302, processing logic receives a user request to export web browser data pertaining to a current web browser (referred to as the source web browser). As discussed above, the web browser data may include bookmarks, security settings, general settings, links to documents accessed by a user, a home page, cookie settings, user interface (UI) elements, intermediate files maintained by the web browser, etc. UI elements associated with the web browser may specify, for example, visibility of toolbars in the browser windows, positioning of toolbars within the browser window, visibility of buttons on a toolbar, positioning of buttons on the toolbar, color settings, background images, skins, themes, etc. Intermediate files maintained by the web browser may include, for example, cached documents viewed by the user, plug-in executable files (e.g., plug-ins for displaying different types of audio and video messages), browsing history records, and various temporary files used by the web browser. In one embodiment, processing logic receives the user request when the user presses an export settings button in the browser window. In one embodiment, the user request specifies which browser settings need to be exported. Alternatively, the user request covers all web browser data pertaining to the source web browser.

At processing block 304, processing logic collects the web browser data according to the user request.

At processing block 306, processing logic packages the collected web browser data into an intermediate format (e.g., an XML format, a binary format, etc.).

At processing block 308, processing logic stores the formatted web browser data in a browser settings data store. In one embodiment, this data store resides on the same client device as the source web browser. Alternatively, the browser settings data store resides on a server.

Figure 4:
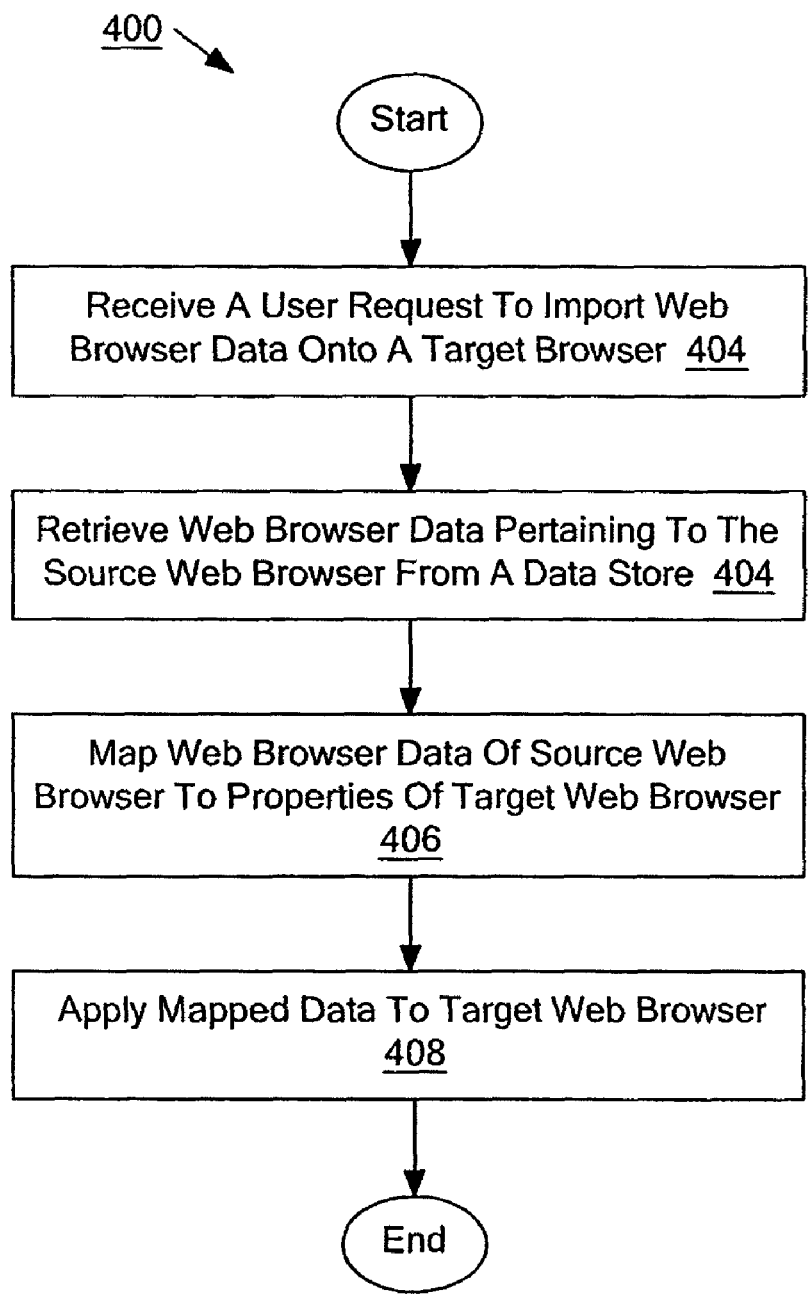
FIG. 4 presents a flow diagram of one embodiment of a method for importing web browser data.

FIG. 4 presents a flow diagram of one embodiment of a method 400 for importing web browser data. The method may be performed by processing logic, which may comprise hardware, software, or a combination of both. Processing logic may reside either in a client device, or partially or entirely in a separate device and/or system(s).

At block 402, processing logic receives a user request to import web browser data onto a current web browser (referred to as the target web browser). In one embodiment, the user request identifies the source web browser whose data is to be imported onto the target web browser (e.g., by identifying the instance of the web browser or the type of the web browser). In one embodiment, the user request specifies which browser settings need to be imported. For example, the user may be presented with a list of available settings to allow the user to select the desired settings. Alternatively, the user request covers all web browser data pertaining to the source web browser.

The source web browser and the target web browser may reside on the same client device or different client devices and may be of the same browser type or different browser types.

At block 404, processing logic retrieves web browser data pertaining to the source web browser from a data store. In one embodiment, processing logic retrieves the web browser data upon verifying that the target importer has permissions to access the web browser data. The data store may reside on the same client device as the target web browser, on the client device hosting the source web browser, or on a server. The web browser data is stored in the data store in an intermediate format (e.g., XML or binary format). In one embodiment, if the user request specifies certain browser settings to be imported, processing logic extracts the specified settings from the retrieved web browser data.

At block 406, processing logic maps the web browser data to properties of the target web browser. If the target web browser does not support all of the available browser settings, processing logic discards the portion of web browser settings that is not supported by the target web browser.

At block 408, processing logic applies the mapped data to the target web browser.

Exemplary Computer System

Figure 5:
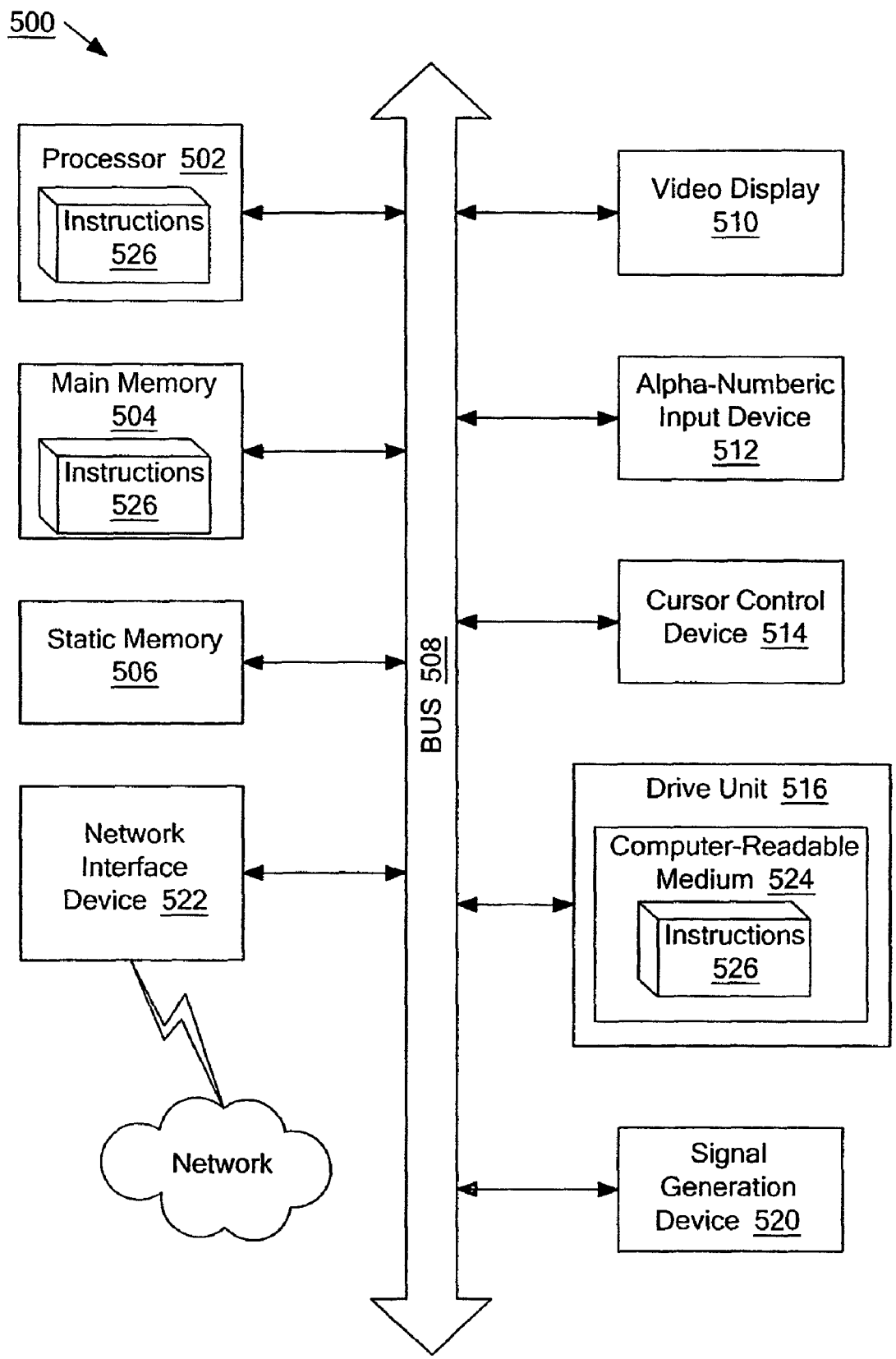
FIG. 5 is a block diagram of one embodiment of a computer system.

FIG. 5 shows a diagrammatic representation of a machine in the exemplary form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

In the foregoing specification, the invention has been described with reference to specific exemplary embodiments thereof It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    receiving, by one or more devices, a request to import browser data, associated with a first web browser, to a second web browser;
    collecting, by the one or more devices and based on receiving the request, the browser data associated with the first web browser, the collected browser data being in a first format;
    packaging, by the one or more devices, the collected browser data into a second format to form transformed browser data, the first format being different than the second format;
    assigning a tag to each of one or more data items included in the collected browser data, each tag representing a data type of a corresponding one of the one or more data items;
    determining, by the one or more devices, whether the one or more data items are supported by the second web browser; and
    sending, by the one or more devices and to a device associated with the second web browser, the transformed browser data and the tag assigned to each of the one or more data items, the second web browser utilizing browser data in a third format that is different than the second format,
        sending the transformed browser data and the tag assigned to each of the one or more data items including:
            importing, to the second web browser, a portion of the transformed browser data and the tag assigned to each data item of a corresponding portion of the one or more data items, based on determining whether the one or more data items are supported by the second web browser.

2. The method of claim 1, where the second format includes an extensible markup language (XML) format.

3. The method of claim 1, where the one or more devices include the device associated with the second web browser.

4. The method of claim 1, where a type of the first web browser is different than a type of the second web browser and the first format is different than the third format.

5. The method of claim 1, where receiving the request to import the collected browser data to the second web browser includes:
    detecting selection of an option, of a web browser window associated with the first web browser, to import one or more settings of the first web browser,
    where the request to import the collected browser data is received based on the selection of the option to import the one or more settings of the first web browser.

6. The method of claim 1, further comprising:
    determining, based on the tag assigned to each of the one or more data items, that:
        a first portion of the one or more data items is supported by the second web browser, and
        a second portion of the one or more data items is not supported by the second web browser, where the first portion is different than the second portion; and
    importing, to the second web browser, the first portion of the one or more data items,
    where the second portion of the one or more data items is not imported to the second web browser, and
    where the corresponding portion of the one or more data items includes the first portion of one or more data items and none of the second portion of the one or more data items.

7. The method of claim 1, where the one or more data items include one or more of:
    user interface (UI) data, settings data, browsing history data, bookmark data, profile data, autofill data, password data, popup blocker data, information identifying frequency of accessing documents, information identifying when documents are accessed, or information identifying plug-ins, and where assigning the tag to each of the one or more data items includes:
assigning a tag to one or more of the UI data, the settings data, the browsing history data, the bookmark data, the profile data, the autofill data, the password data, the popup blocker data, the information identifying frequency of accessing documents, the information identifying when documents are accessed, or the information identifying plug-ins.

8. The method of claim 1, where collecting the browser data associated with the first web browser, packaging the collected browser data into the second format, assigning the tag to each of the one or more data items are performed at particular time intervals,
the method further comprising:
storing, on a server device, the transformed browser data and the tag assigned to each of the one or more data items,
where sending the transformed browser data and the tag assigned to each of the one or more data items includes:
sending the stored browser data and the stored tag assigned to each of the one or more data items to the second web browser based on the particular time intervals.

9. The method of claim 1, where a type of the first web browser is a same type of web browser as a type of the second web browser.

10. A computer-implemented method comprising:
receiving a request to export data associated with a first web browser;
detecting, based on the received request, selection of at least one setting from a plurality of settings associated with the data associated the first web browser;
obtaining a portion of the data associated with the first web browser,
where the obtained portion of the data corresponds to the at least one setting, and
where the obtained portion of the data is associated with a first format;
packaging the obtained portion of the data into a second format, that is different than the first format, to form transformed data,
where the second format is adapted to be imported by a second web browser;
assigning a tag to each of one or more data items included in the obtained portion of the data, each tag representing a data type of a corresponding one of the one or more data items; and
storing the transformed data and the tag assigned to each of the one or more data items on a storage system.

11. The computer-implemented method of claim 10, where the second format includes an extensible markup language (XML) format.

12. The computer-implemented method of claim 11, where the storage system is a remotely located server, and
where storing the transformed data and the tag assigned to each of the one or more data items includes:
transmitting, via a network and for storage at the remotely located server, the transformed data and the tag assigned to each of the one or more data items.

13. The computer-implemented method of claim 10, further comprising:
presenting the plurality of settings associated with the data based on receiving the request,
where the at least one setting is selected from the presented plurality of settings associated with the data.

14. The computer-implemented method of claim 10, further comprising:
detecting selection of at least one other setting from the plurality of settings;
obtaining another portion of the data associated with the first web browser,
where the obtained other portion of the data corresponds to the at least one other setting; and
storing the obtained other portion of the data,
where the obtained other portion of the data is sent to at least one of the second web browser or a third web browser.

15. The computer-implemented method of claim 10, where the first web browser is presented in a web browser window, and
where receiving the request to export the data associated with the first web browser comprises:
detecting selection of a button associated with the web browser window; or
detecting selection of a particular option from a drop-down list associated with the web browser window.

16. The computer-implemented method of claim 10, further comprising:
comparing the tag assigned to each of the one or more data items with one or more types of data that are associated with the second web browser; and
determining, based on a result of the comparison, that only a portion of the one or more data items corresponds to the one or more types of data that are associated with the second web browser,
where the portion of the one or more data items is less than an entirety of the one or more data items, and
where only the portion of the one or more data items is sent to the second web browser.

17. The computer-implemented method of claim 10, further comprising:
detecting selection of an option, in a web browser window, to import the data, associated with the first web browser, to a third web browser that is presented in the web browser window;
detecting selection of one or more settings from the plurality of settings after detecting the selection of the option; and
importing one or more portions of the data, associated with the first web browser, to the third web browser,
where the one or more portions of the data correspond to the one or more settings.

18. The computer-implemented method of claim 17, further comprising:
obtaining the one or more portions of the data based on detecting the selection of one or more settings; and
assigning a tag to each of a plurality of data items included in the obtained one or more portions of the data, each tag representing a data type of a corresponding one of the plurality of data items included in the obtained one or more portions of the data.

19. The computer-implemented method of claim 10, where the one or more data items include one or more of:
user interface (UI) data, settings data, browsing history data, bookmark data, profile data, autofill data, password data, popup blocker data, information identifying frequency of accessing documents via the first web browser, information identifying when documents are accessed via the first web browser, or information identifying plug-ins,
where assigning the tag to each of the one or more data items includes:

assign a tag to one or more of the UI data, the settings data, the browsing history data, the bookmark data, the profile data, the autofill data, the password data, the popup blocker data, the information identifying frequency of accessing documents via the first web browser, the information identifying when documents are accessed via the first web browser, or the information identifying plug-ins.

20. The computer-implemented method of claim 10, where the stored data and the stored tag assigned to each of the one or more data items are sent to a device associated with the second web browser, the second web browser utilizing data in a third format that is different than the second format.

21. A computer-readable memory device comprising:
one or more instructions which, when executed by at least one processor, cause the at least one processor to receive a request to export data associated with a first web browser,
one or more instructions which, when executed by the at least one processor, cause the at least one processor to detect, based on the received request, selection of at least one setting from a plurality of settings associated with the data associated with the first web browser,
one or more instructions which, when executed by the at least one processor, cause the at least one processor to obtain a portion of the data associated with the first web browser,
where the obtained portion of the data corresponds to the at least one setting, and
where the obtained portion of the data is associated with a first format,
one or more instructions which, when executed by the at least one processor, cause the at least one processor to package the obtained portion of the data into a second format, that is different than the first format, to form transformed data,
where the second format is adapted to be imported by one or more second web browsers,
one or more instructions which, when executed by the at least one processor, cause the at least one processor to assign a tag to each of one or more data items included in the obtained portion of the data, each tag representing a data type of a corresponding one of the one or more data items, and
one or more instructions which, when executed by the at least one processor, cause the at least one processor to store the transformed data and the tag assigned to each of the one or more data items.

22. The computer-readable memory device of claim 21, where the at least one processor is associated with a third web browser,
where the third web browser is presented in a web browser window, and
where the computer-readable memory device further includes:
one or more instructions to detect selection of an option, in the web browser window, to import the data, associated with the first web browser, to the third web browser,
one or more instructions to detect selection of one or more settings from the plurality of settings after the selection of the option has been detected, and
one or more instructions to import one or more portions of the data, associated with the first web browser, to the third web browser,
where the one or more portions correspond to the one or more settings.

23. The computer-readable memory device of claim 22, where the first web browser is presented in a web browser window, and
where the one or more instructions to receive a request to export data associated with the first web browser includes at least one of:
one or more instructions to detect selection of a button associated with the web browser window, or
one or more instructions to detect selection of a menu item associated with the web browser window.

24. The computer-readable memory device of claim 22, where the stored data and the stored tag assigned to each of the one or more data items are sent to one or more devices associated with the one or more second web browsers, the one or more second web browsers utilizing data in a third format that is different than the second format, and
where the second format includes an extensible markup language (XML) format.

* * * * *